(12) United States Patent
Schilling et al.

(10) Patent No.: US 6,761,761 B1
(45) Date of Patent: Jul. 13, 2004

(54) LOWER SACCHARIDE NANOMETRIC MATERIALS AND METHODS

(75) Inventors: Christopher H. Schilling, Midland, MI (US); Piotr Tomasik, Cracow (PL); Marek Sikora, Cracow (PL)

(73) Assignee: The United States of America as represented by the United States Department of Energy, Washington, DC (US)

( * ) Notice: Subject to any disclaimer, the term of this patent is extended or adjusted under 35 U.S.C. 154(b) by 560 days.

(21) Appl. No.: 09/836,168

(22) Filed: Apr. 18, 2001

Related U.S. Application Data

(60) Provisional application No. 60/199,125, filed on Apr. 24, 2000.

(51) Int. Cl.[7] .............................................. C24B 35/02
(52) U.S. Cl. ........................................ 106/217.9; 501/1
(58) Field of Search ............................. 106/217.9; 501/1

(56) References Cited

U.S. PATENT DOCUMENTS 5,300,144 A * 4/1994 Adams .................... 106/124.2

* cited by examiner

*Primary Examiner*—David Brunsman
(74) *Attorney, Agent, or Firm*—Brian J. Lally; Daniel D. Park; Paul A. Gottlieb

(57) ABSTRACT

A ceramic composition having at least one nanometric ceramic powder, at least one lower saccharide, and water. The composition is useful in many industrial applications, including preparation of stronger and substantially defect-free green and sintered ceramic bodies.

12 Claims, 2 Drawing Sheets

Shear stress vs. strain rate for a 30 vol. % nanometric alumina composition.

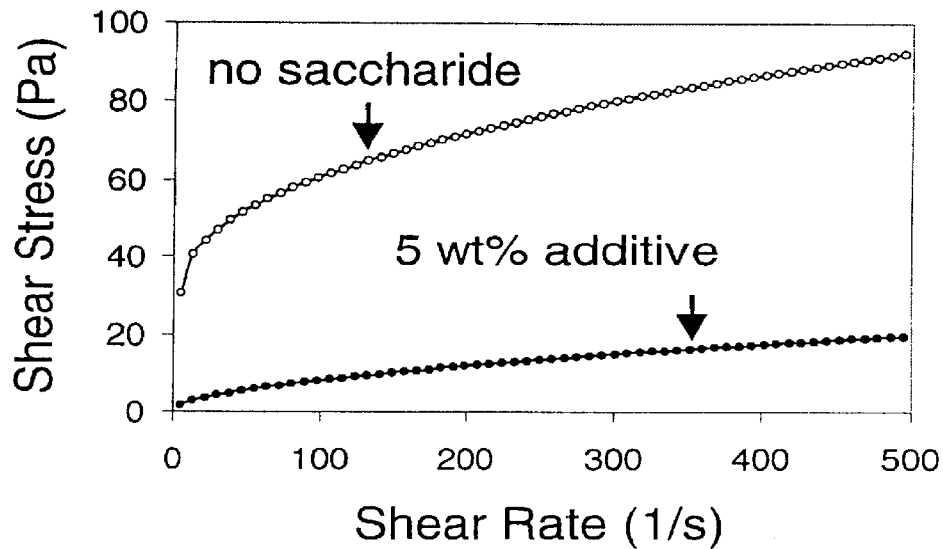
Figure 1. Shear stress vs. strain rate for a 30 vol. % nanometric alumina composition.

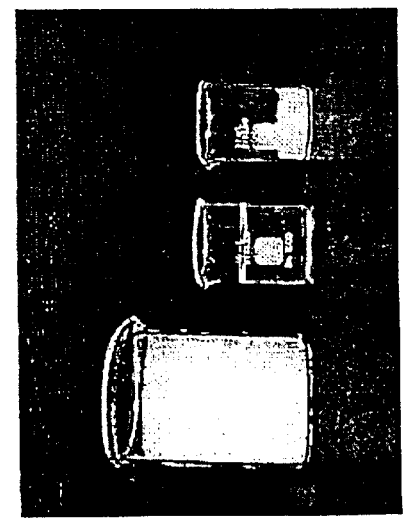

US 6,761,761 B1

LOWER SACCHARIDE NANOMETRIC MATERIALS AND METHODS

This application is submitted with reference to Provisional Application No. 60/199,125 filed on Apr. 24, 2000 that bears an identical title.

The United States Government has certain rights in this invention pursuant to Contract Number W-7405-ENG-82 between the Department of Energy and Iowa State University.

FIELD OF THE INVENTION

The present invention relates to ceramic compositions and products, and more particularly, to nanometric ceramic compositions containing one or more sugars or sugar alcohols with improved physical characteristics which are useful in many industrial applications. The invention also relates to new methods for the production of nanometric ceramic compositions and products which are stronger and less prone to defects.

BACKGROUND OF THE INVENTION

In the past decade, many companies have begun production of nanometric-scale powders for engineering and other industrial applications. In addition to ultrafine metal particles that are manufactured in Japan specifically for use in magnetic recording tape, nanometric powders available in industrial scale quantities have largely been carbides (WC is the most used), and the ceramic oxides (e.g., $SiO_2$, $CeO_2$, $TiO_2$, $Al_2O_3$, FeO and antimony oxide) as well as others. Applications for these nanometric ceramic powders have included ultra-thin dielectrics, solid-oxide fuels, and oxygen separation systems, to name just a few.

Traditional manufacturing has involved a sequential process of (i) blending nanometric powders with organic liquids into a viscous paste, (ii) molding the paste into an engineering component (green body), (iii) pyrolizing the organic constituents by heating the green body to approximately 200° C., and (iv) high-temperature kiln firing (sintering). During sintering, interparticle void space (porosity) in the compact is eliminated by atomic diffusion, a process causing significant shrinkage of the engineering part (e.g., 50%). This shrinkage increases as the green-body porosity increases. If the green-body porosity is above a critical value, sintering shrinkage is excessive, and this results in cracks and warpage. In addition, if the green-body porosity is not volumetrically uniform, sintering produces nonuniform shrinkage and more cracks.

Thus, a serious problem is the inability to mold pastes of nanometric powders into green bodies with low porosity and volumetrically uniform porosity. As a result, cracks and warpage during sintering represent a major obstacle towards the realization of new markets for engineering nanopowders. There are at least a few reasons why this might occur. One of these is that Van der Waals attractions cause nanoparticles to spontaneously agglomerate into porous, skeletal structures. This occurs when powders are dry or suspended in a liquid. Interparticle contact friction prevents rearrangement of these skeletal structures into less porous agglomerates. The application of mechanical pressure is not enough to compact these skeletal structures into low-porosity greenbodies. Interparticle contact friction is simply too high.

This problem can be alleviated to some extent by mixing nanoparticles with various organic chemicals (e.g., methacrylates, acrylamides, polyethylene oxide, and vinyl alcohols). However, there are serious problems with the pyrolysis of these organics: (i) slow and costly heating (e.g., 200° C. for one week) is required to avoid the formation of cracks and gas bubbles, (ii) toxic fumes are emitted, and (iii) residual carbon contaminates the final microstructure. In many cases, large concentrations of organic solvents (e.g., alcohols, ketones, and waxes such as polyethylene wax) are needed to dilute these additives when blended with nanopowders. Safety and environmental hazards are associated with the handling, evaporation, and recycling of these solvents. It should also be recognized that capillary stresses during solvent evaporation are inversely proportional to the particle size. Extremely large capillary stresses occur during drying of green bodies made of nanopowders. These large stresses often produce cracks, which do not heal during subsequent sintering. Usually these cracks are serious enough to fracture the green body into two or more separate fragments.

What is therefore needed in the art are new nanometric ceramic compositions which, when molded from a cast and then sintered, preferably provide substantially improved ceramic bodies in which stresses leading to warps, fissures and cracks are reduced or eliminated.

SUMMARY OF THE INVENTION

According to one embodiment of the invention there is provided a ceramic composition which is made up of at least one nanometric ceramic powder, at least one lower saccharide, and water. Also contemplated is an industrial product which is manufactured using this composition.

In a further embodiment of the invention, there is provided a nanometric ceramic composition which contains about 25 to 75 vol. % of at least one nanometric ceramic powder, about 0.1 to 5 wt. % of at least one lower saccharide, about 0.001 to 1 wt % of at least one ionic material, and water.

Also provided as part of the invention is a method for reducing the viscosity of a nanometric ceramic composition in which an effective amount of at least one lower saccharide is added thereto. In addition, there is also provided a method for reducing the porosity as well as the defects of a ceramic green body which comprises adding an effective amount of at least one lower saccharide thereto.

In another aspect of the invention there is provided a method of forming a nanometric ceramic composition in which about 25 to 75 vol. % of at least one nanometric ceramic powder, about 0.1 to 5 wt. % of at least one lower saccharide, and about0.001 to 1 wt % of at least one ionic material is admixed with water so as to produce a paste or slurry.

Additional advantages and features of the present invention will become more readily apparent from the following detailed description and drawings which illustrate various embodiments of the invention.

BRIEF DESCRIPTION OF THE DRAWINGS

FIG. 1 is graph of shear stress vs. strain rate for a 30 vol. % nanometric alumina composition according to various preferred embodiments of the invention.

FIGS. 2A, 2B and 2C are a series of photographs illustrating the rheology of a nanometric ceramic composition according to one embodiment of the invention.

DETAILED DESCRIPTION OF THE PREFERRED EMBODIMENTS

Sugar alcohols, and lower carbon chain saccharides, including monosaccharides, disaccharides, trisaccharides, tetrasaccharides and oligosaccharides have a natural tendency to sorb to metal and metal oxide powders in aqueous media. As a result, these materials have now been shown to reduce interparticle attraction and enable the formation of dense moldable pastes of nanometric ceramic and metal powders. Use of these saccharide materials with nanopowders also enables the formation of pastes having substantially uniform volumetric porosity. Since most of the interparticle phase is water, it evaporates safely without causing microstructure contamination in the final sintered parts. In addition, these saccharides form strong, interparticle bonds after water evaporation, which enables processing of strong, crack-free green-bodies. These saccharides are also crosslinkable, which further increases green-body strength and in turn results in strong, substantially defect-free sintered bodies which are useful in the manufacture of ultra-thin dielectrics, solid-oxide fuel cells, catalysts, oxygen separation membranes, abrasive polishing slurries, metal injection molded parts, and WC-Co high performance tooling materials.

In a first embodiment of the invention there is provided a nanometric ceramic composition. The composition is desirably in the form of a slurry or paste, with water, as hereinafter described.

As a first component of the composition there is provided one or more members selected from the group consisting of ceramic, metal, metal alloy and metal oxide powders. These powders are those typically utilized in the art for industrial applications, and can include, for example, carbides such as tungsten carbide (WC) or tungsten carbide-Co (WC-Co), as well as silicas, aluminas and ceramic oxides such as $SiO_2$, $CeO_2$, $TiO_2$, $Al_2O_3$, FeO, antimony oxide, and the like. Any or all the foregoing compounds, as well as others known in the art with industrial ceramic or metal applications, will be collectively referred to herein as ceramic powders and are within the scope of the invention.

The foregoing ceramic powders are desirably of nanometric size. This means that they preferably range in diameter from about 1 to 100 nanometers (nm) (1 nm=$10^{-9}$ meters) or so, and more preferably are within the range of about 10 to 60 nanometers. In some embodiments, it is desirable to use a range of nanometric powder sizes. In this way, the smaller nanometric particles can occupy at least some of the space between the larger nanometric particles, and thereby reduce the overall space between particles. This, in turn, results in a decreased overall porosity in the green body structure, hereinafter described, which is ultimately formed from the ceramic composition. The utilization of ceramic powder having a range of nanometric sizes is referred to as "gap grain sizing." Nanometric powders are in contrast to micrometric powders, which are typically on the order of about 1 to about several hundred microns ($10^{-4}$ meters) in diameter.

The preferred ceramic powder(s) will typically comprise about 25 to 75 vol. % of the composition of the invention. More preferably, these powders will make up from about 30 to 75 vol % of the composition, and even more desirably will be within the range of about 35 to 75 vol. % thereof.

Further included in the nanometric ceramic compositions is at least one member preferably selected from the group consisting of sugar alcohols, monosaccharides, disaccharides, trisaccharides, tetrasaccharides and oligosaccharides (~$C_5$–$C_6$). Any or all of the foregoing and similar sugar alcohol or saccharide materials are collectively referred to herein as "lower saccharides." Of the foregoing, the sugar alcohols, and the mono- and disaccharides are especially preferred. Another preferred group includes hexoses and pentoses. It is preferred that the polysaccharides, i.e., those compounds having basic sugar (saccharide) units substantially in excess of about 6 or so, be minimized in the composition of the invention. Use of such compounds in any substantial amount tends to produce unworkable slurries, as hereinafter described.

Examples of suitable lower saccharides include such sugar alcohols as xylitol, sorbitol, maltitol (hydrogenated starch hydrolysate), as well as other known sugar alcohols. Suitable mono- and disaccharides may be selected from xylose, glucose, sucrose, fructose, galactose, arabinose, lactose, maltose and the like. Any of the foregoing lower saccharide materials may be utilized alone or in combination with one another.

Also preferred for use herein is saccharide material having a molecular mean length ($R_s$) which is less than about 20 Angstroms, and more preferably is less than about 10 Angstroms. For example, maltose and glucose have mean lengths of about 9.8 and 4.9, respectively, and are therefore highly suitable for use herein.

The lower saccharides will typically comprise about 0.1 to 5 wt % of the nanometric powder composition. More preferably, one or more of these materials will make up at least about 1 wt % of the composition. It is less preferred to include substantially in excess of about 5 % of lower saccharide material in the composition of the invention. Without being bound by theory, it appears that excessive concentrations of lower saccharide material may tend to caramelize on the surface of the ceramic green body, causing it to break apart during subsequent high heat sintering. However, the exact amount chosen by the skilled artisan will depend in certain measure on the particular saccharide material chosen and the particular ceramic powder utilized, as well as on the rheological characteristics desired in the final composition. As heretofore stated, the presence of higher saccharides, i.e., those compounds having substantially in excess of six sugar units should preferably be minimized in the composition of the invention. If higher saccharides are included with the lower saccharides, then their presence should not exceed about 10%, more preferably about 3%, and even more desirably about 1% by weight or less of the lower saccharides.

Another preferred component of the composition of the invention may be an ionic material. As that term is used herein, "ionic material" refers to a chemical compound which under appropriate chemical and/or physical conditions, can separate into one or more positively and/or negatively charged ions. Preferred ionic material therefore includes salts, in particular ionic salts. Of these, the salts resulting from the reaction of the Group I, Group II, and transition metals, as well as ammonium, together with the Group VII halogens, are particularly desirable. Examples include NaCl, $MgCl_2$, $ZnCl_2$, and $LaCl_3$. In particular, salts such as sodium chloride (NaCl) and ammonium chloride ($NH_4Cl$) are especially useful.

The ionic material will preferably comprise about 0.001 to 1 wt % of the composition. In a more preferred embodiment, the ionic material will be included in amounts ranging from about 0.005 to 0.1 wt % of the composition.

The remainder of the nanometric ceramic composition is preferably water. Water may be included in amounts as desired by the skilled artisan so that the composition will have the desired rheological characteristics as hereinafter described. Preferably, the composition includes sufficient water to adequately dissolve or otherwise disperse the lower saccharide material so as to prevent caramelization thereof during subsequent sintering. Any excess water easily and safely evaporates during sintering.

In addition to the foregoing described materials, many other additives can optionally be included in the nanometric ceramic composition. These may be chosen from the traditional listing of such materials available in the ceramic industry, and can also include other materials as well. Preferably, however, the composition and the resultant ceramic body will be substantially free of certain volatile organic materials which are often referred to as polymeric crosslinking materials, or in an alternative embodiment, will contain reduced amounts of these materials. Such polymeric crosslinking materials include (poly)methacrylates, (poly)acrylamides, polyethylene oxides and waxes, and (poly)vinyl alcohols, for example. These materials are toxic and often are difficult to work with, and therefore replacing them with non-toxic lower saccharide alternatives is especially preferred. Thus, the invention in a further embodiment provides a method for reducing or even eliminating the amount of volatile organics in industrial ceramic compositions by incorporating lower saccharide material therein.

The foregoing components of the invention are then admixed in suitable order until a substantially thick slurry or paste is obtained, which is preferably amorphous, pourable, and non-agglomerated. In addition, dilute suspensions of the foregoing components can be prepared using excess water, and then filtered to the desired consistency. The slurry or paste should be suitable for further processing, for example, into a green body. Thus, the rheology of the paste or composition may be optimized by the skilled artisan. The inclusion of one or more lower saccharides will typically result in a lowering of the viscosity of the composition than would otherwise be obtainable without inclusion of the saccharide material as heretofore described. Preferably, the composition of the invention will have a viscosity within the range of about 0.005–0.03 Pa/s–1, and more desirably about 0.01–0.02 Pa/s–1. It is further contemplated that the composition of the invention will have at least about a 50% lower viscosity than the same composition not containing any lower saccharide material. More preferably, the viscosity of the composition according to its various embodiments will be at least about 80% lower than a comparative example. In some embodiments, a reduction in viscosity of at least about 90% is contemplated. Use of any or substantial amounts polysaccharide materials, as heretofore set forth, is best avoided because in certain embodiments these compounds when used in any significant amount with nanometric ceramic powders tend to produce highly viscous and intractable slurries that are not suitable for further processing.

According to a further embodiment of the invention, there is contemplated both a green ceramic body and a final sintered ceramic body which is prepared from the nanometric ceramic composition heretofore described, as well as methods for producing these ceramic bodies.

A green ceramic body may be prepared from the composition of the invention by any suitable method. For example, molding operations such as ram pressing, slip casting, injection molding, and gelcasting can be used to mold the composition into green bodies. By utilizing the preferred composition of the invention, it is now possible to obtain green bodies with a lower porosity and a substantially more uniform porosity than would otherwise have been obtainable without the composition of the invention. Without being bound by any particular theory, it now appears that the lower saccharides form strong, interparticle bonds with the nanometric ceramic material, which in turn results in stronger, more resilient and more defect-free green bodies which are less likely to crack and warp.

Once a green body is prepared, the ceramic body can be sintered to produce a sintered ceramic body, preferably using high-temperature kiln firing, for example. During sintering, significant shrinkage of the body normally occurs. This can typically be on the order of as much as 50% by weight of the green body. As heretofore described, the greater the green-body porosity, the greater is the shrinkage and the higher is the likelihood of warps, cracks, and fissures (defects). In addition, the less uniform the green body porosity, the greater the likelihood of nonuniform shrinkage and even more cracks. By utilizing the preferred composition of the invention, however, sintered bodies with less defects are obtainable because the green body has a lower porosity and a more uniform overall porosity to start with.

The nanometric ceramic composition of the invention, as well the final sintered ceramic bodies prepared using the invention, have many applications. A sample, non-exhaustive listing of suitable applications include ultra-thin dielectrics, solid-oxide fuel cells and catalysts, oxygen separation systems for medical and aerospace applications, abrasive polishing slurries, metal injection molded parts, WC-Co high performance tooling, high-thermal conductivity liquid applications, microelectronic adhesives, and transparent wood stains and sunscreens. Other uses are also within the scope of the invention.

The following examples are provided to illustrate certain embodiments of the invention, but should not be construed as limiting the scope thereof.

Example 1

Rheological measurements were performed to demonstrate the effects of various saccharides on plastic flow behavior. Alumina powder with an average particle diameter of 37 nm was purchased from Nanophase Technologies Corporation, Burr Ridge, Ill. Saccharides as well as sugar alcohols were purchased from Sigma Chemical Company of St. Louis, Mo. Ammonium chloride was purchased from Fisher Scientific, Fair Lawn, N.J. Stock solutions of deionized water, 0.01 M ammonium chloride, and varying concentrations of a given saccharide were initially prepared and stirred for approximately 20 minutes. Saccharide concentrations of 0, 1, 3, and 5 wt. % were used in preparing these solutions. A weighed amount of nanometric alumina powder (30 vol. %) was then added to each solution, followed by 24 hours of shaking in sealed, plastic containers. All suspensions were prepared at room temperature. Rheological measurements were performed at room temperature with a computer-controlled rheometer having a double-gap cylinder (RheoStress RS 75; DG 41; DIN 54453 produced by Gebruder Haake GmbH, Darlsruhe, Germany). Each specimen was subjected to an increasing shear rate starting at $5^{s-1}$ and ending at $500^{s-1}$. The shear rate was subsequently swept back to $5^{s-1}$. This process of sweeping the shear rate up and down was subsequently repeated on the each specimen two more times in order to verify repeatability.

As shown in FIG. 1, alumina suspensions without saccharide exhibited highly viscous, thixotropic behavior with a Bingham yield stress of approximately 30 Pa. The viscosity is significantly reduced upon the addition of 5 wt % of a given saccharide additive. Tested were a variety of such saccharides as arabinose, xylose, D-mannitol, xylitol, D-sorbitol, maltitol, galactose, fructose, and sucrose. In these cases, the Bingham yield stress goes to zero and the flow behavior is approximately the same as that shown in FIG. 1 under the label, "5 wt % additive." Lower concentrations of saccharide raised the flow curve (data not shown). Shown in FIG. 1 are the results of testing the various saccharides noted.

Example 2

This example illustrates the rheology of a nanometric ceramic composition according to one embodiment of the invention. FIG. 2A is a photograph showing separate beakers of alumina (15 g), water (7 ml) and lower saccharide (2.7 g). FIG. 2B is a further photograph showing that when the alumina and water are combined, the result is a paste which is not pourable. FIG. 2C shows that when a lower saccharide is admixed with the alumina and water, the resultant composition is a thick, yet pourable, non-agglomerated admixture which is highly suitable for subsequent green body formation.

The foregoing description is illustrative of exemplary embodiments which achieve the objects, features and advantages of the present invention. It should be apparent that many changes, modifications, substitutions may be made to the described embodiments without departing from the spirit or scope of the invention. The invention is not to be considered as limited by the foregoing description or embodiments, but is only limited by the construed scope of the appended claims.

What is claimed as new and desired to be protected by Letters Patent of the United States is:

1. A moldable aqueous formulation for a ceramic composition having volumetrically uniform porosity and having low inter-particle contact friction, comprising:
   at least one nanometric ceramic powder capable of withstanding kiln firing; at
   least one lower saccharide having up to six saccharide units; and water.

2. The formulation for a ceramic composition of claim 1, wherein:
   said nanometric ceramic powder is selected from a group consisting of:
      carbides, ceramics, ceramic oxides, metals, metal alloys and metal oxide powders.

3. The formulation for a ceramic composition of claim 1, wherein:
   said nanometric ceramic powder is selected from a group consisting of:
      tungsten carbide (WC) and ceramic oxides ($SiO_2$, $CeO_2$, $TiO_2$, $Al_2O_3$, FeO and antimony oxide).

4. The formulation for a ceramic composition of claim 1 wherein, said nanometric ceramic powder ranges in diameter from about 1 nanometer to about 100 nanometers.

5. The formulation for a ceramic composition of claim 1, wherein:
   said lower saccharide is selected from a group consisting of: sugar alcohols, monosaccharides, disaccharides, trisaccharides, tetrasaccharides, hexoses, pentoses, and oligosaccharides.

6. The formulation for a ceramic composition of claim 5, wherein said lower saccharide has a mean length that is less than about 20 Angstroms.

7. The formulation for a ceramic composition of claim 1, wherein:
   said nanometric ceramic powder is about 25 to 75 vol. % of the ceramic composition;
   said lower saccharide is about 0.1 to 5 wt. % of the ceramic composition; and
   where the composition has an added ionic material that is about 0.001 to 1 wt % of at least one ionic material.

8. The formulation for a ceramic composition of claim 7, wherein:
   the presence of at least one lower saccharide having up to six saccharide units in the moldable aqueous paste results in a reduction of internal shear stress from about 80 Pa to about 15 Pa when subjected to a shear rate of about 300/s as compared to pastes that were prepared without said lower saccharide having up to six saccharide units.

9. The formulation for a ceramic composition of claim 7, wherein said composition is in the form of a paste or slurry.

10. The formulation for a ceramic composition of claim 7, wherein said ionic material is selected from a group consisting of: sodium chloride (NaCl), magnesium chloride ($MgCl_2$), zinc chloride ($ZnCl_2$), and lanthanum chloride ($LaCl_3$).

11. A method of forming a moldable aqueous paste formulation having volumetrically uniform porosity and having low inter-particle contact friction for a ceramic composition, which comprises admixing:
   about 25 to 75 vol. % of at least one nanometric ceramic powder capable of withstanding kiln firing;
   about 0.1 to 5 wt. % of at least one lower saccharide having up to six saccharide units,
   about 0.001 to 1 wt. % of at least one ionic material; and water;
   wherein said method produces a paste or slurry.

12. An industrial product resulting from kiln firing a formulation of a ceramic composition, comprising:
   at least one nanometric ceramic powder; at least one lower saccharide having up to six saccharide units; and water.

* * * * *